United States Patent
Feuer

[15] 3,703,961
[45] Nov. 28, 1972

[54] ROTARY BIOLOGICAL FLOW-THROUGH FILTER

[72] Inventor: Robert Feuer, Laurelton, N.Y.

[73] Assignee: Aqua Treatment Industries, Inc., Valley Stream, N.Y.

[22] Filed: Feb. 18, 1970

[21] Appl. No.: 12,353

[52] U.S. Cl. ................................210/151, 261/92
[51] Int. Cl. ...........................................B01d 33/06
[58] Field of Search .........210/150, 151, 403; 261/92

[56] References Cited

UNITED STATES PATENTS

| | | | |
|---|---|---|---|
| 2,586,692 | 2/1952 | Morel | 210/150 X |
| 2,765,915 | 10/1956 | Nilsson | 210/403 X |
| 3,134,826 | 5/1964 | Jalma | 261/92 |
| 2,758,722 | 8/1956 | Murray | 210/403 X |
| 3,117,927 | 1/1964 | Smith | 210/403 X |
| 3,403,095 | 9/1968 | Chipperfield et al. | 210/151 X |
| 3,565,797 | 2/1971 | Gresham | 210/151 X |
| 3,567,629 | 3/1971 | Ayers et al. | 210/151 X |

*Primary Examiner*—John Adee
*Attorney*—Lilling & Siegel

[57] ABSTRACT

Secondary treatment for comminuted, screened or clarified sewage. The sewage is supplied to a filter assembly consisting of a rotating pair of flanges, one blank and one perforated, with arcuately shaped filter elements sandwiched between the flanges. By providing a large surface area for the filters and making them of a material to which slime will adhere, biological treatment is obtained. Further, the assembly rotates in the atmosphere providing air without aeration equipment enhancing the aerobic biological purification process.

11 Claims, 6 Drawing Figures

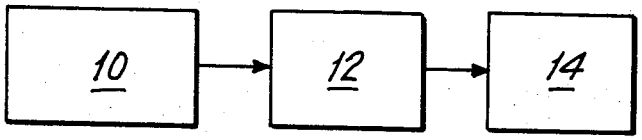
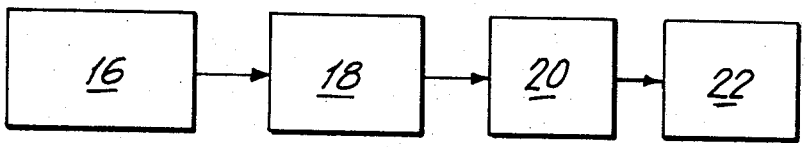
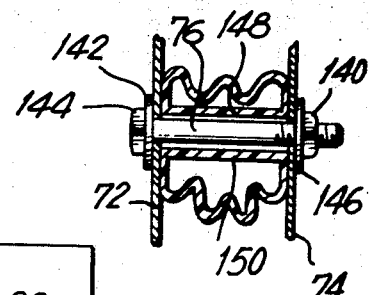
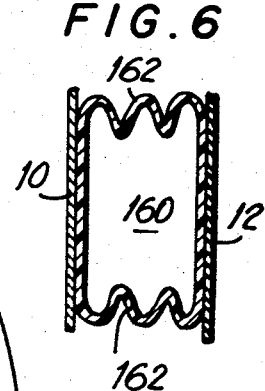
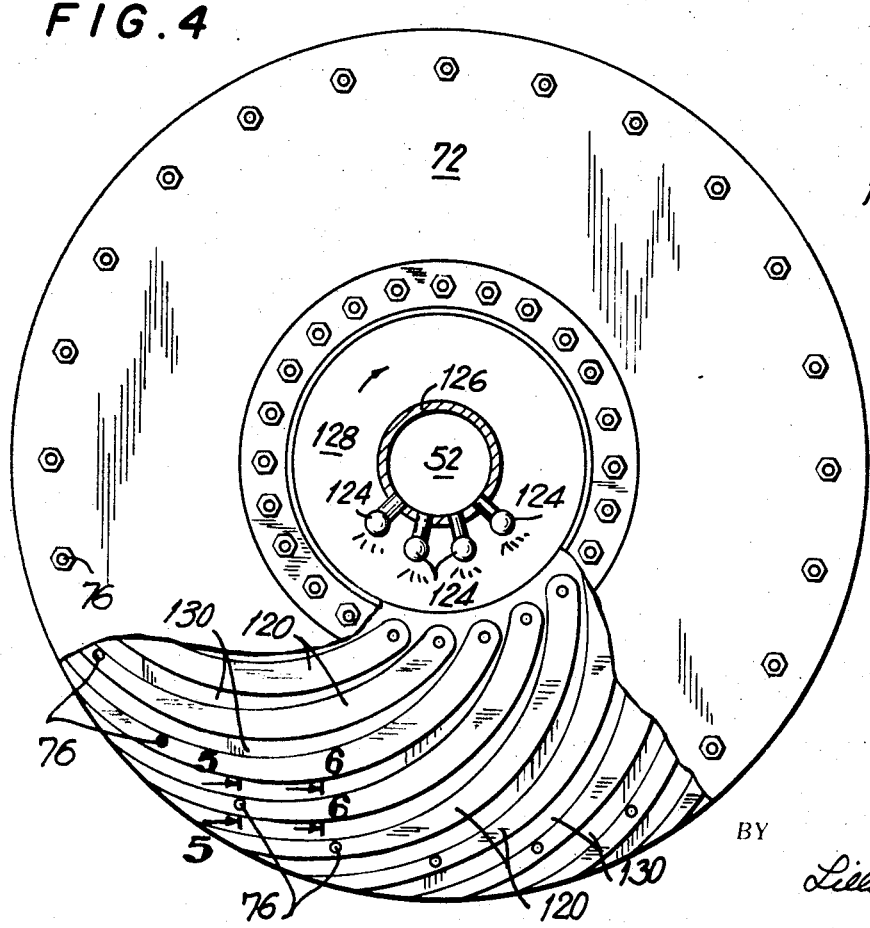
INVENTOR.
ROBERT FEUER

INVENTOR.
ROBERT FEUER ically with the principles of the present invention.

ROTARY BIOLOGICAL FLOW-THROUGH FILTER

BACKGROUND OF THE INVENTION

This invention relates to secondary sewage treatment, and more particularly, to an aerobic biological process of sewage treatment.

Ecologists have been aware of the need for better environmental control for some time, although the general public has only recently become alarmed at the severe air and water pollution problems. A spate of solutions for water pollution, and, in particular, water purification have been proposed in response to the newly raised public outcry. Unfortunately, existing and proposed primary and secondary sewage treatment suffer numerous disadvantages. Primarily, these disadvantages relate to the degree of purification obtained which generally is unacceptable unless enormous sums are expended.

Secondary treatment of sewage has been widely used to enhance the sewage treatment process. Among the devices utilized is a rotating disk assembly immersed in a tank which provides unsatisfactory performance. Such immersion prevents air from being in the filter at all times which is desirable for an aerobic process. Essentially, the air captured by the disk, when out of the tank, provides the air supply to the living biological organisms in the slime. As can be readily understood, frequently not enough air is captured to foster maximum growth of the biological aerobic slime organisms. Another problem encountered with such secondary treatment devices relates to clogging, while still another is the relatively poor biological treatment efficiency obtained. Further, prior art disk assemblies frequently allow "short circuiting" to occur, that is, the sewage passes around the filter without filtration action.

An object of the present invention is to provide improved aerobic sewage treatment.

Another object of the present invention is to provide improved secondary sewage treatment.

Still another object of the present invention is to obtain maximum sewage treatment with minimum cost and materials.

Another object of the present invention is to provide maximum aeration to foster growth of aerobic biological slime organisms.

Still another object of the present invention is to minimize short circuiting problems found in the prior art.

Another object of the present invention is to provide secondary sewage treatment apparatus suitable for domestic and industrial use.

Yet another object of the present invention is to provide sewage treatment apparatus which is small and compact in size so that same could be applicable in situations having limited space available, such as boats, submarines, and the like.

Still another object of the present invention is to provide a secondary sewage treatment process substantially free from clogging.

Another object of the present invention is to provide secondary sewage treatment apparatus which conveniently may be used with a sedimentation tank.

Still another object of the present invention is to provide a sewage treatment device which may easily be installed with existing sewage treatment equipment upgrading the existing plant.

Another object of the present invention is to provide a roughing filter for industrial wastes with very high influent biological oxygen demand (B.O.D.).

Still another object of the present invention is to provide a sewage filter system being provided with easily replaceable filter elements.

Another object of the present invention is to provide secondary treatment without using a tank structure.

Still another object of the present invention is to provide a sewage treatment process capable of operating under a steady head or even at an adjustable rate responsive to the influent flow.

Another object of the present invention is to provide an extremely compact, yet efficient, filtration element for use with the principles of the present invention.

Other objects, advantages, and features of the present invention will become more apparent from the following description.

SUMMARY

In accordance with the principles of the present invention, the above objects are accomplished by providing a rotating aerobic sewage filter assembly comprising a pair of oppositely disposed flanges, a plurality of arcuately shaped filter elements held between the flanges, forming the assembly with the flanges, the filter elements being fabricated of a material such that biological slime can easily adhere to the surface of the filter elements, a plurality of channels located between the plurality of filter elements, means for passing sewage through the channels, and support means for freely supporting the assembly to maintain a continuous aerobic filtering process.

In particular, the present filter consists of an annular spaced filter using synthetic media held firmly between two metal or plastic flanges, one blind and the other with an annular shape. Both flanges are connected to each other by bolts and structural spacers and are attached to a pipe with an inner diameter equal to or greater in diameter to the hole in the filter. This pipe is mounted in two or more collars in a manner as to permit rotation. Gears are affixed to the outside of one end of the pipe to attach via gearing to a variable speed motor, provided to turn the assemblage at a rate based on demand.

A leakproof holding tank with an upsprout-funnel combination underneath is provided at one end of the pipe. Either comminuted screened or clarified sewage is pumped into the holding tank at a rate synchronized electronically with the drive motor of the filter so as to give an exact ratio of drive speed to hydraulic load, and so as to maintain as closely as possible a constant head and filter rotating speed. The flow passes down a slightly inclined assemblage to the filter element.

By rotation, one segment of the filter at a time is dosed, the remainder being subject to the reaeration of the atmosphere. The filter bears a slime which biologically degrades the degradables in the sewage. Treated sewage plus sloughings of slime then fall into a hopper with a funnel bottom which leads directly downwards to the sedimentation tank beneath. This lends itself very well to the development of a package treatment plant capable of treating relatively larger flows than has ever been feasible for prefabricated installation. Single units of perhaps two to five million gallons per day capacity each may be feasible. Heretofore about one half to one million gallons per day capacity were the limit and achieved only with great difficulty.

A further use of the present filter is to upgrade existing treatment facilities by merely placing it above an existing final sedimentation tank or other unit. It is also ideally suited for industrial wastes roughing treatment as well as for full treatment as, due to geometry large BOD loadings /s.f./ day are achieved. Its potential versatility extends to the fact that it may be used in underdeveloped areas where power is not available, as the slow drive required of the present filter can be easily run on small and primitive power supplies.

It has been demonstrated that the beneficial effect of a temperature augmentation on biological processes of this type is substantial. In the past, it was deemed impractical to provide artificial heat for trickling filters of large acreage. As this filter element is above the flow and is very small, it will now be feasible to provide constant year round temperature control by space heating a small enclosure.

As an additional application, alpha particle radiation may be applied to the effluent of the rotating filter at the point when the flow enters the hopper.

Flocculation is caused, among other things, by the mutual attraction of ionized materials in the flow. A problem in sewage flocculation is the presence of excess negative ions. These heretofore have been neutralized by the addition of macromolecules of polymers rich in plus charge which is a generally expensive procedure, although widely used. By condensing the flow to a small area just beyond the present filter the use of irradiation from a rich alpha-particle source, properly shielded against any dangers, could provide a cheaper and more efficient agglomerant agent. This could significantly reduce the size of the sedimentation tank, thereby limiting the size of a process treatment plant.

BRIEF DESCRIPTION OF THE DRAWINGS:

FIG. 1 is a block diagram showing the filter of the present invention being used as roughing filter;

FIG. 2 is a block diagram illustrating the present filter being used to provide secondary treatment;

FIG. 4 is a front view of the present rotary filter with a flange partially broken away showing the filter arrangement;

FIG. 5 is a sectional view taken generally along lines 5—5 of FIG. 4; and

FIG. 6 is a sectional view taken generally along lines 6—6 of FIG. 4.

DESCRIPTION OF THE PREFERRED EMBODIMENT

Figure 3:
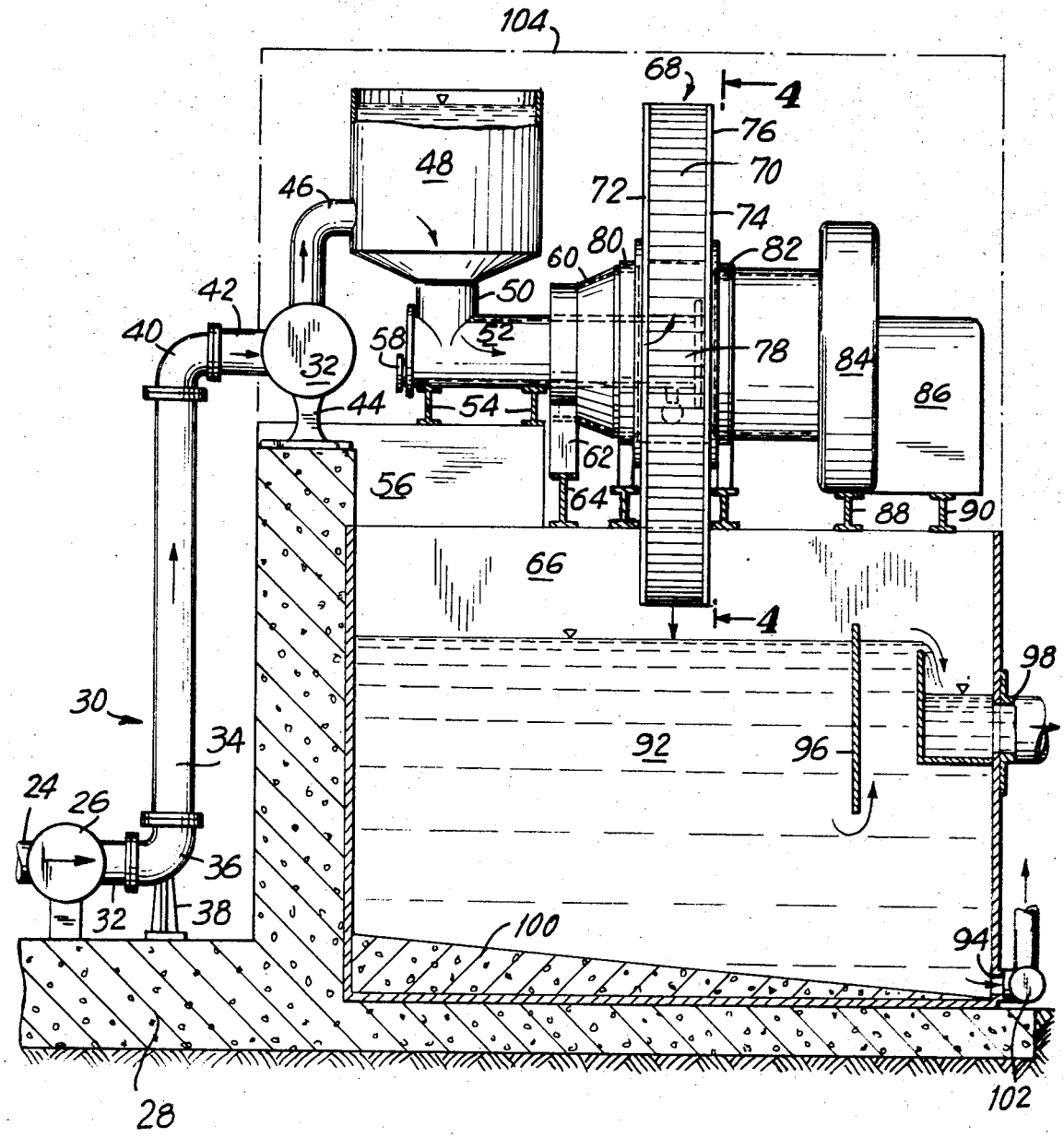
FIG. 3 is a pictorial diagram showing a process treatment plant utilizing the filter of the present invention.

The attention focused on water pollution problems has increasingly been directed towards the large volume of industrial wastes being discharged into domestic sewage systems. The strength of such sewage is often very much greater than that of domestic systems often having a biological oxygen demand (B.O.D.) in several thousands p.p.m. whereas domestic sewage has a B.O.D. generally in the range of 100–200 p.p.m. The rotating filter of the present invention is described as being used in an industrial waste processing plant although its use in other areas is readily apparent.

FIGS. 1 and 2 illustrate flow diagrams for industrial waste processes to be used with the present filter. A high concentration influent 10 is passed through the filter of the present invention 12 to the standard sewage processing apparatus 14 presently utilized. Filter 12 serves a roughing function when placed in this point of the illustrated industrial sewage processing plant. Significant improvement over the existing apparatus is achieved by using the rotating filter for roughing without inordinate plant expenses. Further, the size of filter 12 does not significantly alter the space requirement presently utilized for the treatment of industrial wastes.

FIG. 2 illustrates yet another common arrangement found for processing industrial wastes. The high concentration influent is supplied through a primary filter 16 and then to a secondary sewage treatment device 18. The output of the secondary treatment apparatus is supplied through the filter of the present invention 20 to a clarifier 22. Primary filtering device 16, secondary treatment device 18 and clarifier 22 are existing well-known systems presently utilized for the treatment of industrial wastes. By merely inserting the new filter 20 in the treatment process, significant improvements are realized. As before, minimal plant costs are incurred when installing the present filter and minimal plant space is required.

While FIGS. 1 and 2 illustrate common industrial sewage processes in block form, FIG. 3 is a more detailed diagram of a sewage plant utilizing the principles of the present invention. The waste or influent is supplied to the input of an elongated cylindrical pipe 24 and through a standard screen or comminuter 26. The comminuter or screen is securely and fixedly mounted to a supporting base 28. Supporting base 28 provides a relatively vibration-free yet secure, fixed positional support for the elements in the industrial process plant shown in FIG. 3.

The comminuted or screened sewage flows out of comminuter 26 through a generally cylindrical pipe and elbow combination and is drawn up to a variable speed pump 32. In particular, a generally horizontally extending pipe 32 carries the comminuted influent out of comminuter 26 and is connected to a substantially vertical pipe 34 by means of an elbow connection 36. The elbow is fixedly attached to base 28 by means of a suitable support structure 38. The generally vertically flowing comminuted influent though pipe 34 is directed horizontally by means of an elbow 40 connected between vertical pipe 34 and a horizontal pipe 42.

Horizontal pipe 42 carries the waste to the variable speed pump 32 which is also fixed to base 28 by means of a suitable support structure 44. The variable speed pump 32 forces the waste through a generally L-shaped pipe 46 to a sewage surge and holding tank 48. The holding tank generally is large enough to serve as a buffer in that more waste may be received than is carried out therefrom during any given moment, and that a relatively constant head may be maintained over long periods.

The sewage held in tank 48 is gravity supplied through an up-sprout funnel combination 50 to a generally horizontally disposed carrier pipe 52.

Horizontally disposed carrier pipe 52 is supported by suitable beams 54 connected between the bottom of pipe 52 and a support structure 56 generally attached to base 28. Carrier pipe 52 preferably is slightly inclined enabling the sewage carried therein to flow towards the filter 68 of the present invention. A standard clean-out device 58 is connected to one end of carrier pipe 52 to provide the desired clean-out function. Carrier pipe 52 is held within an epoxy-lined tapered steel pipe or pipe of other similarly tile materials 60 which is supported by a ball-bearing support 62 resting on a suitable support beam 64 held on a support structure 66 fixed to the base 28.

The comminuted, screened or clarified sewage passes down the slightly inclined assemblage of pipe 52 to the filter element 68. The filter of the present invention consists of an annularly shaped filter assembly 70 mounted and firmly held between two metal or plastic flanges 72 and 74. The flanges are connected to each other by means of bolts 76 and are separated by structural spreaders designed to maintain the shape of the filter and are attached to carrier pipe 52 whose diameter is equal to or slightly greater than the diameter in a central hole 78 of the filter. Carrier pipe 52 is mounted in two or more collars 80 and 82 to permit rotation of the filter 68. Flange 72, preferably, is annularly shaped while flange 74 is blind causing the sewage to flow through the filter.

A drive motor 84 and generator 86 supported on support structure 66 by means of suitable support beams 88 and 90, respectively, are coupled to the rotating portion of the filter of the present invention thereby causing the filter to rotate.

The filter 68 is continuously exposed to the atmosphere and by rotation, one segment of the filter at a time is dosed, the remainder being subject to the reaeration of the atmosphere. The filter bears a slime which biologically degrades the degradables in the sewage. As described above, maximum exposure to the atmosphere significantly increases the biological degradation achieved by using the present filter. This represents a significant improvement over the existing devices.

The output of filter 78 drops into a hopper 92 with a funnel bottom 94 leading directly to the sedimentation tank below (not shown). Hopper 92 includes a baffle 96 which directs the flow of sewage to the funnel bottom while, if the hopper fills above the level of baffle 96, the output of the filter is supplied directly through an output pipe 98. The sludge is collected on the sloped bottom 100 of the hopper tank and a pump 102 is provided to force the sludge out of the hopper. An alternate sedimentation tank has a mechanical collector. Scum and floating objects are skimmed off the top of the flow.

Due to the compact nature of the present filter, the beneficial effect achieved by environmental control on sewage filtering processes of this type may be achieved. Previously, due to the large acreage required, providing artificial environmental control was inappropriate due to the enourmous expense incurred. In accordance with a feature of the present invention, it is relatively feasible to provide such environmental control by heating the small enclosure indicated by dotted line 104 thereby achieving the beneficial effects of such environmental control. As a further advantage of the compact nature of the present filter, suitable odor control may be accomplished by ozonating, enclosing the filter or other suitable methods well known in the art.

By synchronizing the drive motor 84 to the variable speed pump 32 by means of a suitable feedback mechanism having automatic speed control means (not shown), it is possible to more effectively handle the variety of loads presented to the processor thereby eliminating much waste and inefficiency commonly found in the prior art.

FIG. 4 shows the filter flanges partially broken away. The filter comprises a plurality of arcuately shaped filter elements 120 fixed between the two flanges 72 and 74 by means of suitable bolts 76 arranged in a circular configuration bordering the outer periphery of the flange and a concentric inner set of bolts 122. The sewage is carried through pipe 52 against blind flange 74 and is dispersed by means of a plurality of nozzles or openings 124 attached to a fixed inner ring 126 which does not rotate with the filter. In this manner, the sewage enters through pipe 52 and is dispersed downwardly through spray nozzles 124 to pass through an annular air space 128 to the channels defined between the outer surfaces of the plurality of filter elements 120.

Preferably, the filter rotates in a counter-clockwise direction and carries the sewage to be filtered by the slime which is formed and adheres to filter elements 120. Generally, it is expected that the slime will be up to three-fourths of an inch thick on each outer surface of the filter element and the channel width provided between neighboring filter elements is chosen to insure that no sewage will pass through the filter without contacting the biologically degrading slime. As may be clearly seen by viewing FIGS. 3 and 4, the filtering elements are continuously exposed to the atmosphere even when the sewage is passing through the lower portion of the rotating disk assembly. This effectively enhances the biological slime growth by exposing the entire rotating disk assembly to the surrounding atmosphere. The material chosen for the filter element need only permit adhesion by the slime and, preferably, is a plastic type material known to those skilled in the art familiar with synthetic media utilized for filters.

FIGS. 5 and 6 present sectional views through lines 5—5 and 6—6, respectively, of FIG. 4. Sectional view 5—5 is taken through an area of the assembly in which the connecting bolt 76 is located fixedly securing flanges 72 and 74 together. As may be seen in FIG. 4, the bolts 76 also are connected to each filter element fixedly securing the filter element to the rotating assembly. Flanges 72 and 74 are provided with aligned annular bores to permit the passage of bolt 76 attached to a suitable nut 140. In order to prevent sewage from leaking from between the flanges, a suitable annular gasket 142 is placed between bolt head 144 and flange 72 while another annular gasket 146 is located between nut 140 and flange 74. To prevent the flanges from collapsing in towards each other, a pair of spacers 148 and 150 are provided between flanges 72 and 74 and are permanently and fixedly held therebetween. Of course, the two piece bolt and spacer assembly can be made unitary so as to form a spacer bolt.

FIGS. 5 and 6 illustrate one shape which may be employed for the outer surface of the filter elements. The outer surface is provided with an irregular or double W-shape. This permits a large outer surface area to be utilized for the adhesion of the biologically degrading slime per unit area. Other shapes for the outer surfaces of the filter elements may be provided to further increase the contact surface area available for the slime. In operation, the inner portion 160 of the filter element remains dry while the sewage passes contiguous to and contacts the outer surface 162 of the filter element. It may thus be seen that the above objects are efficiently attained utilizing the principles of the present invention.

Further, it should be understood that the above described embodiments illustrate the principles of the present invention and, therefore, should not be construed to limit the scopt of the protection available to the invention by this patent application.

What is claimed is:

1. A sewage treatment device adapted for the aerobic bacteriological processing of sewage, for use in a sewage treatment plant, comprising: a rotatable filtering unit having a plurality of filter elements; a pair of flanges spaced apart from each other and holding said filter elements fixedly therebetween; opening means in one of said flanges for receiving said sewage; means carrying said sewage from said opening means to said filter elements; each of said filter elements have an arcuate shape and extending from said opening means to the peripheral edge of said filtering unit and forming passageways therebetween for said sewage; means adapted to rotate said device as sewage flows into said filtering unit between said filter elements, whereby the growth of biological slime organisms on the outside surfaces of said filter elements are fostered as said filtering unit is rotated in atmospheric conditions.

2. A device according to claim 1 having automatic speed control means for adjusting the speed at which said filter unit rotates responsive to the amount of sewage received.

3. A device according to claim 1 wherein the outer surface of each of said filter elements is irregular in shape whereby greater filtering area is provided.

4. A device according to claim 1 wherein one of said pair of flanges is provided with an annular opening as said opening means and the other of said pair of flanges is blind.

5. A device according 4 claim 4, including a plurality of nozzles for carrying said sewage to said filter elements, said plurality of nozzles being located in the path of flow of said sewage after said annular opening and before said plurality of filter elements.

6. A device according to claim 5 having a plurality of nozzles or openings interposed in the flow of sewage between said opening and said plurality of filters, said plurality of nozzles remaining fixed while said filter rotates.

7. A device according to claim 1 wherein said flanges are plastic.

8. A device according to claim 1 wherein said flanges are metallic.

9. A device according to claim 1 including a plurality of bolts concentrically disposed around said pair of flanges securing said pair of flanges together and said plurality of filter elements between said flanges.

10. A device according to claim 1 including a plurality of structural spacers with each one of said plurality of structural spacers connected to a respective one of said plurality of bolts.

11. A device according to claim 1 including means to control said atmosphere whereby optimum filtering action is obtained.

* * * * *